(12) United States Patent
Gegalski et al.

(10) Patent No.: US 6,213,570 B1
(45) Date of Patent: Apr. 10, 2001

(54) VALVE ARRANGEMENT

(75) Inventors: Helmut Gegalski, Mühlheim-Kärlich; Thomas Wald, Holnich, both of (DE)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/545,047

(22) Filed: Apr. 7, 2000

Related U.S. Application Data

(63) Continuation of application No. PCT/EP98/06366, filed on Oct. 7, 1998.

(30) Foreign Application Priority Data

Oct. 8, 1997 (DE) ............................................. 197 44 317

(51) Int. Cl.⁷ ..................................................... B60T 8/36
(52) U.S. Cl. ...................................................... 303/119.2
(58) Field of Search .............................. 303/113.5, 119.2; 137/596.17, 625.33

(56) References Cited

U.S. PATENT DOCUMENTS

| | | |
|---|---|---|
| 5,141,027 | 8/1992 | Magnasco . |
| 5,522,651 * | 6/1996 | Sorensen ........................... 303/113.5 |
| 5,618,086 * | 4/1997 | Reuter ................................ 303/119.2 |
| 5,645,325 * | 7/1997 | Mueller et al. .................... 303/119.2 |
| 5,934,766 * | 8/1999 | Feigel et al. ...................... 303/119.2 |

FOREIGN PATENT DOCUMENTS

| | | |
|---|---|---|
| 28 31 733 A1 | 1/1980 | (DE) . |
| 34 22 214 C2 | 12/1994 | (DE) . |
| 44 41 150 A1 | 5/1996 | (DE) . |

\* cited by examiner

*Primary Examiner*—Christopher P. Schwartz
(74) *Attorney, Agent, or Firm*—MacMillan, Sobanski & Todd, LLC

(57) ABSTRACT

In a valve arrangement with a first and a second fluid connection (7, 9), a valve element (3) which is biased into a first position by a spring arrangement (4), in which the first and the second fluid connections (7, 9) are blocked from each other, an actuation means (17) in order to bring the valve element (3) into a second position in which the first and the second fluid connections (7, 9) are in a primary flow connection (A), a relatively large flow cross-section between the fluid connections is to be made, on the one hand, the force to be exerted by the actuation means, on the other hand, is to be relatively low in order to save costs, efforts, as well as installation space. For this purpose it is proposed that a further valve element (11) be provided which is biased into a first position by a further spring arrangement (12), in which the first and the second fluid connections (7, 9) are blocked from each other, and which by means a further actuation means can be brought into a second position in which the first and the second fluid connections (7, 9) are in a secondary flow connection (B), are initially in the secondary flow connection (B) only, and subsequently are in the primary flow connection (B) or in the first and the second flow connection (A, B), with the flow cross-section of the primary flow connection (A) being larger than the flow cross-section of the secondary flow connection (B). In a particularly preferred manner, the inventive valve arrangement is utilised in a lock-protected brake system.

12 Claims, 3 Drawing Sheets

VALVE ARRANGEMENT

This application is a continuation of PCT/EP98/06366 filed Oct. 7, 1998.

BACKGROUND OF THE INVENTION

The invention relates to a valve arrangement with a first and a second fluid connection, a valve member which is biased into a first position by a spring arrangement, in which the first and the second fluid connections are blocked from each other, and an actuation means adapted to move the valve element into a second position in which the first and the second fluid connections are in a primary flow connection.

Such a valve arrangement is known among others as a so-called "normally closed" valve. As is already indicated by this term, the flow connection between the fluid connections is blocked in the non-actuated condition, i.e. in the basic or normal, respectively, condition, while the flow connection between the fluid connections is made in the actuated condition. In order to block the flow connection between the fluid connections in the non-actuated condition, a valve element is biased under the action of a spring arrangement, so that it sealingly contacts a sealing seat. In order to make the flow connection between the fluid connections in the actuated condition, it is necessary that the actuation means exerts a force which is capable of at least overcoming the biasing force of the spring arrangement, so that the valve element is lifted off the sealing seat.

However, it is not sufficient for most applications if the actuation means exerts a force which is only minimally higher than the biasing force of the spring arrangement, because during operation different fluid pressures occur at the fluid connections of the valve arrangement so that, in addition, a pressure differential force acts on the valve member, which, depending on the effective direction, counteracts the force applied by the actuation means. Accordingly, the actuation means is to be designed in such a manner that the actuation force is higher than the sum of the biasing force of the spring arrangement and the maximum pressure differential force to be expected in order to ensure a reliable function of the valve arrangement. The great disadvantage is that the actuation means is virtually over-dimensioned, in particular, if a large flow cross-section in the actuated condition of the valve arrangement is required, as is the case in the majority of the applications, in order to preclude a throttle effect of the valve arrangement. A large flow cross-section, however, additionally involves a very high pressure differential force so that consequently a high actuation force is to be applied. This causes high costs and great efforts in the design of the valve arrangement. In addition, the valve arrangement requires a relatively large installation space.

In view of the above, the object of the invention is to develop a valve arrangement which avoids the above mentioned drawbacks.

SUMMARY OF THE INVENTION

For the solution of the object, the initially mentioned valve arrangement is further developed in that a further valve element is provided which is biased into a first position by a further spring arrangement, in which the first and the second fluid connections are blocked from each other, and can be brought into a second position by a further actuation means, in which the first and the second fluid connections are in a secondary flow connection, so that upon an actuation of the valve arrangement, the first and the second fluid connections initially are only in the secondary flow connection and subsequently in the primary flow connection or in the first and second flow connection, with the flow cross-section of the primary flow connection being larger than the flow cross-section of the secondary flow connection.

The decisive advantage of the inventive valve arrangement is that initially a secondary flow connection is made before the primary flow connection is made. Because of the secondary flow connection, a pressure compensation process between the fluid connections is first initiated in the case in which different fluid pressures at the fluid connections additionally exert a differential pressure force on the valve element, through which the pressure differential force is eliminated, so that the pressure differential force is no longer effective in making the primary flow connection and can no longer act detrimentally. Thus, only a relatively low actuation force is required so that the actuation means can be manufactured economically, with low efforts as well as requiring little installation space. Thereby, the flow cross-section which is primarily determined by the primary flow connection can be relatively amply dimensioned in order to preclude an undesired throttle effect in the through-flow behaviour of the valve arrangement. Due to the fact that the secondary flow connection compared to the primary flow connection has only a small flow cross-section, the pressure differential force to be overcome in making the second flow connection is negligibly low.

The actuation means and/or the further actuation means can preferably be controlled electromagnetically and/or hydraulically. In a particular manner, the actuation means which actuates the valve member for making the primary flow connection, can be controlled electromagnetically, and the further actuation means which actuates the further valve member for making the secondary flow connection can be controlled hydraulically. The further hydraulically operated actuation means can thereby be controlled via the pressure difference which exists between the fluid connections, in order to make the secondary flow connection for the purpose of initiating the pressure compensation process between the fluid connections. When the primary flow connection is made by the electromagnetically operated actuation means after the elimination of the pressure differential force, in this case, too, there is only a relatively low actuation force to be applied. This has a particularly advantageous effect on the design of the electromagnet arrangement of the actuation means, which, on the one hand, means an energy-saving and thus economical current consumption, and, on the other hand, enables an installation space-saving construction of the components of the magnetic circuit, primarily of the solenoid and the armature.

According to a preferred embodiment, the valve member as well as the further valve member can be actuated by a common actuation means. In particular, the common actuation means can be electromagnetically controlled because of the previously explained advantages. The actuation means can comprise a two-stage tappet which, in a first stage, as a function of the armature moving the actuation means, actuates the further valve member only, in order to initially make the secondary flow connection, and subsequently in a second stage to also actuate the valve member or to actuate the valve member only which makes the primary flow connection which characterises the flow behaviour of the valve arrangement. In addition, by the common actuation means, one actuation means can be saved, so that, accordingly, components and costs can be saved and a compact construction of the valve arrangement is obtained.

In a particularly preferred embodiment the valve element is dome-shaped and the further valve element is spherically formed, with the further valve element being arranged within the valve element so that the valve arrangement can be configured in a particularly installation space-saving manner.

Advantageously, the biasing force of the spring arrangement is higher than the biasing force of the further spring arrangement. This renders the actuation force for making the secondary flow connection, which depends on the biasing force of the further spring arrangement, particularly low, primarily, if different fluid pressures prevail at the fluid connections. Moreover, the further spring arrangement can be supported via the spring arrangement in order to achieve a simple and installation space-saving configuration of the valve arrangement.

Under the aspects of simplicity and saving of installation space it is advantageous if the primary flow connection is defined by a sealing seat formed at the housing of the valve arrangement and the valve member. The same applies if the secondary flow connection is formed by a sealing seat formed at the valve element and the further valve element.

Due to the fact that the balance of forces is determined on the one hand by the actuation force to be provided by the actuation means, on the other hand by the biasing force to be provided by the spring arrangement and, from case to case, by the differential pressure force between the fluid connections of the valve arrangement, the spring arrangement, with respect to simplicity and saving of installation space, can bear against the housing of the valve arrangement. The same advantage is given, if the further spring arrangement is supported via the valve member.

An advantageous alternative is to connect the further valve member integrally with the actuation means, whereby components of the valve arrangements can be saved or manufactured more easily, respectively. In order to make the valve arrangement even more compact, it can be provided for the further spring arrangement to bias the actuation means, in order to have the further valve member assume its first position, with the further spring arrangement bearing against the housing of the valve arrangement.

In a particularly preferred manner, the inventive valve arrangement is to be used in a lock-protected brake system which is adapted for a traction-slip as well as a driving dynamics control, and which comprises a pump for this purpose which takes brake fluid from a brake pressure generator unit in order to supply a wheel brake with brake fluid, with the first fluid connection of the valve arrangement being connected with the brake pressure generator unit and the second fluid connection of the valve arrangement being connected with the inlet side of the pump. Due to the use of the inventive valve arrangement, this results in the great advantage that, on the one hand, a relatively large flow cross-section from the brake pressure generator unit to the inlet side of the pump is provided, so that the pump, primarily at low temperatures, i.e. when the brake fluid behaves viscously, can deliver a relatively large volume flow. On the other hand, a relatively low actuation force has to be applied when the valve arrangement is subjected to pressure by the brake pressure generator unit, which is the case upon an actuation of the brake pressure generator unit via the brake pedal by the driver or upon an automatic actuation of the brake pressure generator unit for precharging the pump.

BRIEF DESCRIPTION OF THE DRAWINGS

The invention and further advantageous configurations will be explained in the following with reference to the drawings in which.

DETAILED DESCRIPTION

Figure 1:
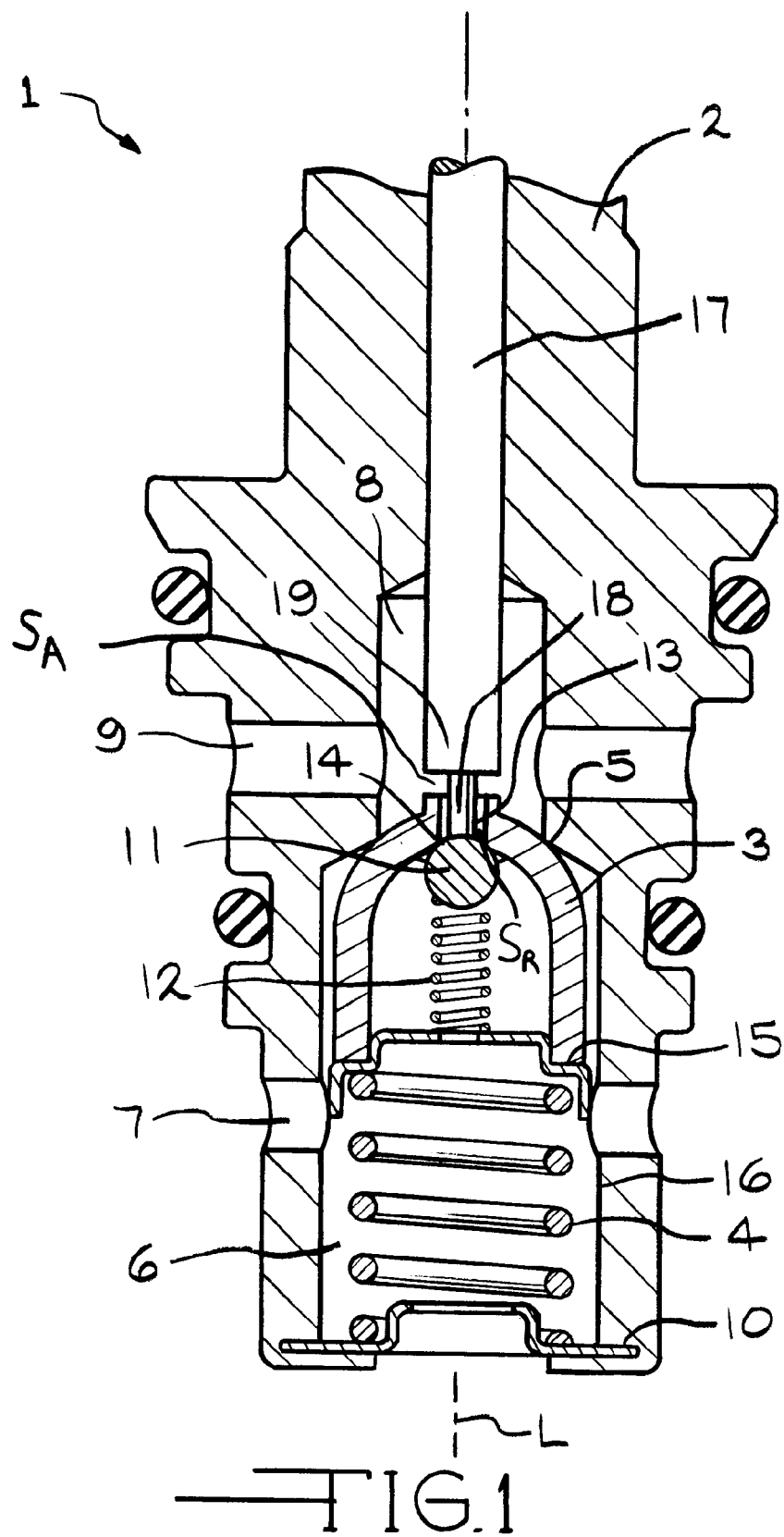
FIG. 1 shows an embodiment of the inventive valve arrangement in the non-actuated condition.
Figure 2:
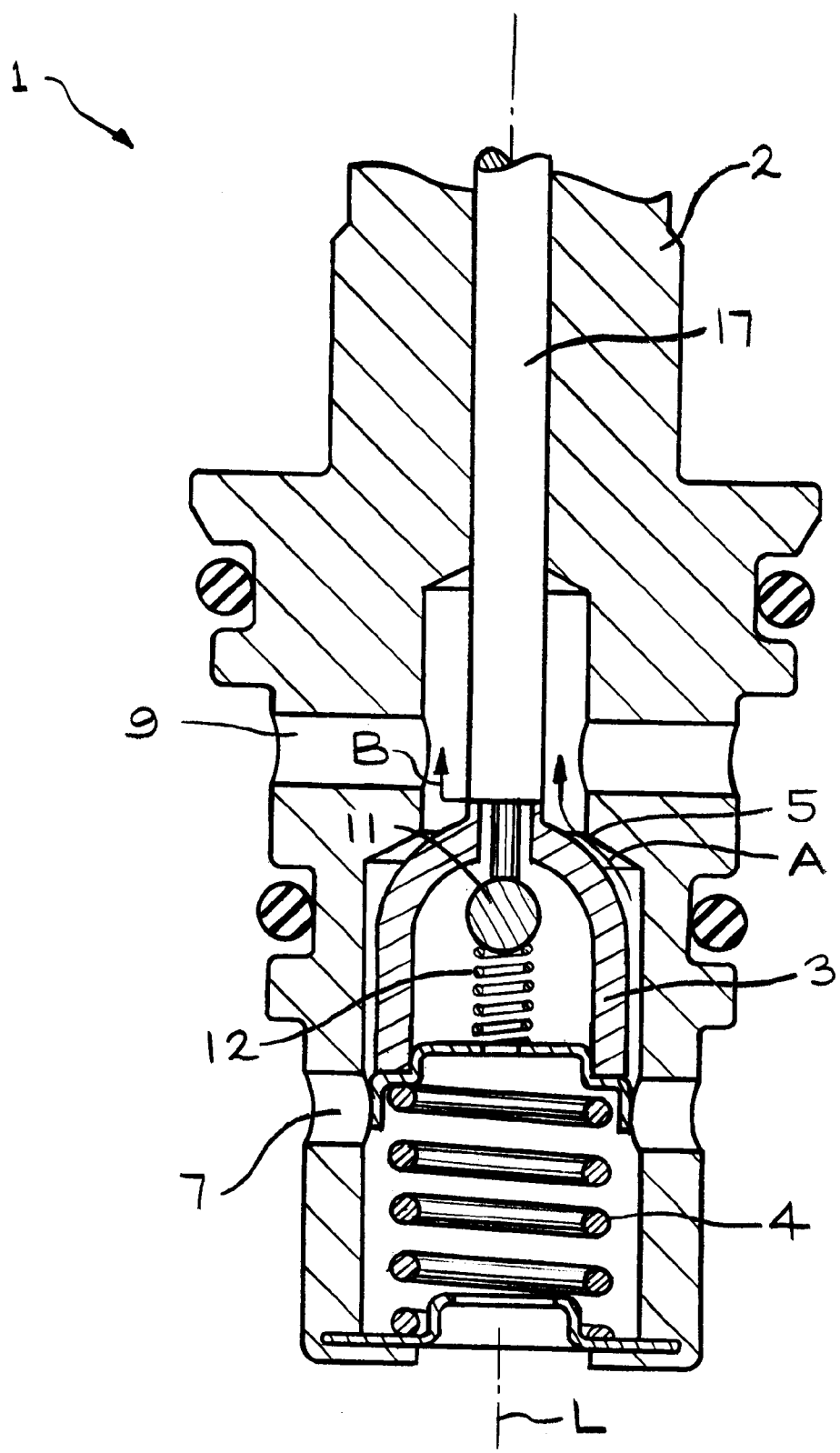
FIG. 2 shows the embodiment of the inventive valve arrangement according to FIG. 1 in the actuated condition.

FIGS. 1 and 2, each show an embodiment of the inventive valve arrangement 1 as a longitudinal section. The construction of the valve arrangement 1 is essentially made rotation symmetrical with respect to a longitudinal axis L.

The valve arrangement 1 consists of a housing 2 in which a valve member 3 and a spring arrangement 4 are accommodated coaxially with the longitudinal axis L. In the housing 2 a sealing seat 5 is formed radially to the longitudinal axis L, with which the valve element 3 cooperates in such a manner that the valve element 3 under the application of a force of the spring arrangement 4 is sealingly biased against the sealing seat 5, as shown in FIG. 1. Thereby, a first pressure chamber 6, which is assigned a first fluid connection 7, and a second pressure chamber 8, which is assigned a second fluid connection 9, are formed. For biasing the valve element 3, the spring arrangement 4 is supported via the housing 2. For closing the pressure chamber 8, a closing part 10 is provided which is sealingly connected with the housing 2, and with which the spring arrangement 4 is in contact. The closing part 10 also comprises a stud-shaped indentation for accommodating the spring arrangement 4, in order to provide the spring arrangement 4 with an (inner) guide axial to the longitudinal axis L.

The valve element 3 is designed dome-shaped in order to accommodate a further valve member 11 which is designed spherically on its side facing towards the first pressure chamber 6 and a further spring arrangement 12 coaxially to the longitudinal axis L. The valve member 3 comprises a central hole 13 coaxially to the longitudinal axis L. On the side of the central hole 13 which faces towards the first pressure chamber 6, a sealing seat 14 is formed radially to the longitudinal axis L at the valve element 3, with which the further valve member 11 cooperates in such a manner that the further valve member 11 under the application of a force of the further spring arrangement 12 is sealingly biased against the sealing seat 14 so that the first and the second pressure chamber 6, 8 are blocked from each other, as shown in FIG. 1. For biasing the further valve element 11, the further spring arrangement 12 is supported via the valve element 3, with the further spring arrangement contacting a holding part 15 comprising fluid openings, which is non-positively connected with the valve element 3, for example via a press-fit. Due to the fact that the valve element 3 bears against the housing 2 via the spring arrangement 4, the further spring arrangement 12 also bears indirectly against the housing 2, so that the holding part 15 can also be loosely connected with the valve element 3. The holding part 15 lies between the valve element 3 and the spring arrangement 4 and comprises an outer rim which radially encompasses the spring arrangement 4 in order to thus provide also an (outer) guide axial to the longitudinal axis L for the spring arrangement 4.

In order to ensure a reliable operation of the valve arrangement 1, a dimension-fitting axial guidance with low sliding friction of the valve element 3 is important. For this purpose, the valve member 3 can immediately be guided in the hole 16 of the housing 2, on the one hand, on the other hand, the axial guidance can be provided in the hole 16 of the housing 2 via the outer rim of the holding part 15 connected with the valve element 3.

For the actuation of the valve arrangement 1, an actuation means 17 is accommodated in the housing 2 coaxially to the longitudinal axis L. On the side facing towards the valve element 3, the actuation means 17 is formed as a step-shaped tappet 18, 19. The front tappet 18 has a diameter which is smaller than the diameter of the central hole 13 so that the front tappet 18 in the central hole 13 penetrates the valve element 3, in order to cooperate with the further valve element 11. The diameter of the rear tappet 19 is larger than the diameter of the central hole 13, so that the rear tappet 19 cooperates with the valve element 3.

The further valve member 11 can also be integrally connected with the actuation means 17 or the tappet 18 or 19, respectively, so that the further spring arrangement 12 can bias the actuation means 17, with the further spring arrangement 12 immediately bearing against the housing 2. With this configuration, the holding part 15 is saved on the one hand, and on the other hand, a very compact construction is obtained, because the further spring arrangement 12 in integrated in the actuation means 17.

In the non-actuated condition of the valve arrangement 1 shown in FIG. 1, the valve element 3, under the application of a force exerted by the spring arrangement 4, is in contact with the sealing seat 5, and the further valve element 11, under the application of a force exerted by the further spring arrangement 12, is in contact with the sealing seat 14, whereby the first pressure chamber 6 or the first fluid connection 7, respectively, is blocked from the second pressure chamber 8 or the second fluid connection 9, respectively. The further spring arrangement 12 biases the actuation means 17 into its non-actuated position via the further valve member 11 and via the front tappet 18. The front tappet 18 is dimensioned in such a manner that it forms a radial gap $S_R$ in the central hole 13, on the one hand, and that an axial gap $S_A$ is formed between the rear tappet 19 and the valve element 3, on the other hand.

Upon an actuation of the valve element 1, for which purpose the actuation means 17 is moved in the axial or y direction, the front tappet 18 first moves the further valve element 11 off the sealing seat 14 against the force of the further spring arrangement 12, whereby a secondary flow connection B is made between the first and the second pressure chamber 6, 8, which extends via the radial gap $S_R$ formed by the front tappet 18 in the central hole 13, as well as via the axial gap $S_A$ which exists between the valve element 3 and the rear tappet 19. Due to the fact that the radial gap $S_R$ and the axial gap $S_A$ are dimensioned relatively large, the effective flow cross-section of the secondary flow connection B is actually determined by the annular gap opening between the further valve element 11 and by the sealing seat 14.

If, upon an actuation of the valve arrangement 1, the actuation means 17 is moved further in the y direction, the rear tappet 19 after exceeding the dimension of the axial gap $S_A$ will come into contact with the valve element 3 so that same will be moved off the sealing seat 5 against the force of the spring arrangement 4, so that a primary flow connection A between the first and the second pressure chamber 6, 8 is made, with the effective flow cross-section of the primary flow connection A being actually determined by the annular gap opening between the valve element 3 and by the sealing seat 5. This actuated condition is shown in FIG. 2. Due to the fact that the flow cross-section of the secondary flow connection B is negligible compared to the flow cross-section of the primary flow connection A it is of no significant difference whether the secondary flow connection B is maintained or blocked, once the primary flow connection A is established. Because of this, the secondary flow connection B can be blocked upon contact of the rear tappet 19 with the valve element 3, or maintained by a suitable configuration of the front or rear, respectively, tappet 18, 19, for example, by means of transverse holes.

In order to make the secondary flow connection B in the previously explained manner before (in time) the primary flow connection A, the biasing force of the further spring arrangement 12 is lower than the biasing force of the spring arrangement 4. Moreover, the effective flow cross-section of the secondary flow connection B is considerably smaller than the effective flow cross-section of the primary flow connection A, because the annular gap opening between the valve member 3 and the sealing seat 5 is larger than the annular gap opening between the further valve member 11 and the sealing seat 14 due to the previously explained radial-geometrical arrangement. Due to this dimensioning of the valve arrangement 1, the actuation means 17 is required to apply only a relatively low actuation force for making the secondary flow connection B. Because, under force aspects, initially only the low biasing force of the further spring arrangement 12 and only then the biasing force of the spring arrangement 4 have to be overcome.

In the case that a higher pressure prevails in the first pressure chamber 6 or at the first fluid connection 7, respectively, than in the second pressure chamber 9 or at the second fluid connection 9, respectively, a differential pressure force has first to be overcome in addition to the biasing force of the further spring arrangement 12, which, however, due to the very small effective flow cross-section of the secondary flow connection s is also low, so that the actuation force to be exerted remains low. However, a pressure compensation process between the first and the second pressure chamber 6, 8 takes place via the secondary flow connection B, by means of which the pressure differential force is (almost) completely relieved so that subsequently upon making the primary flow connection A, only the biasing force of the spring arrangement 4 has to be overcome. If, contrary to that, the pressure difference between the first and the second pressure chamber 6, 8 still existed in the making of the primary flow connection A, a very high pressure differential force would have to be overcome in addition because of the very large effective flow cross-section of the primary flow connection A, which would result in a considerable increase in the actuation force to be exerted. All in all, it is to be stated with respect to the inventive valve arrangement 1 that a flow connection with a very large effective flow cross-section can be made between the first and the second fluid connection 7, 9, with the actuation force to be exerted in relation thereto being very low.

Figure 3:
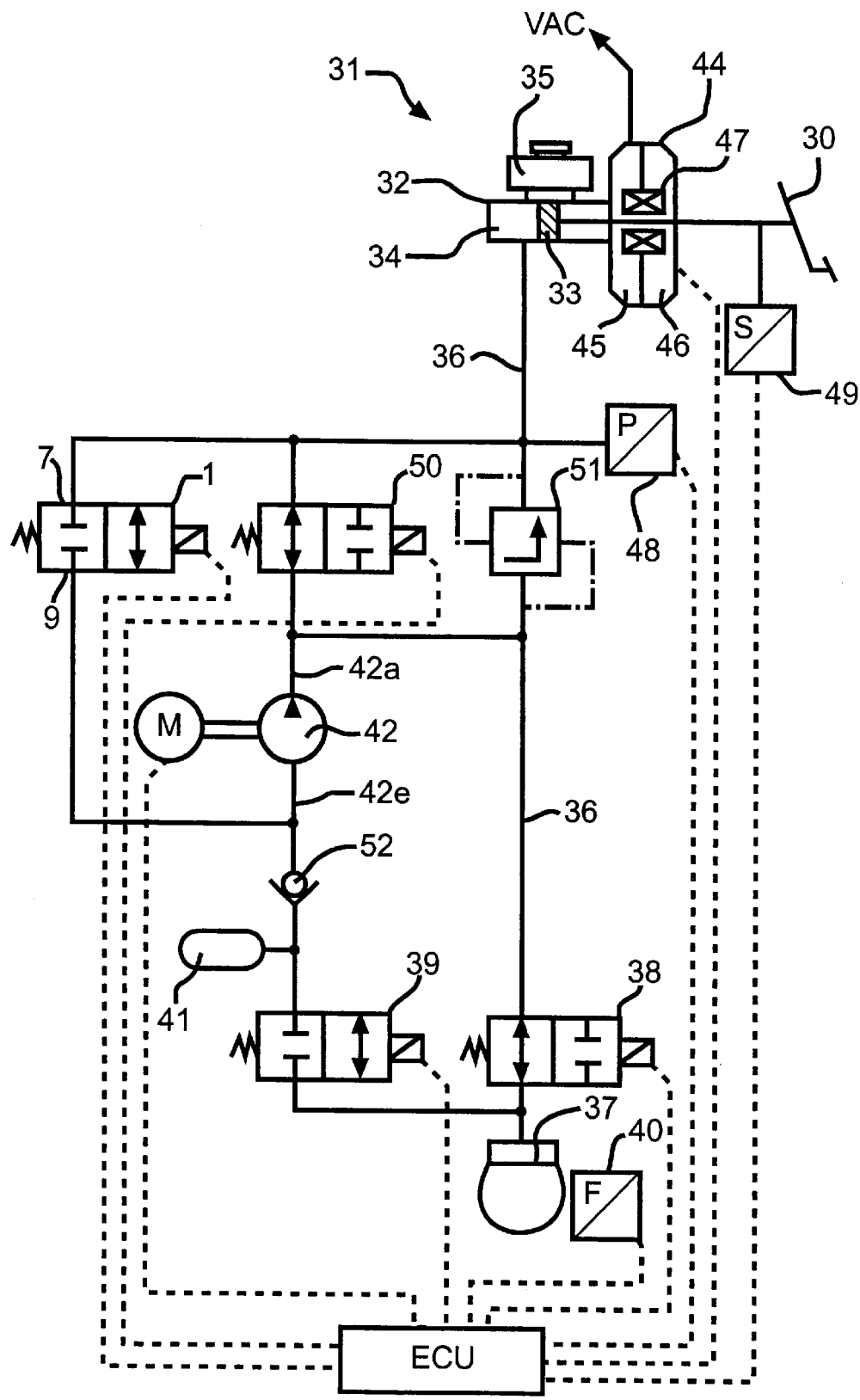
FIG. 3 is a schematic illustration of a lock-protected vehicle brake system in which an inventive valve arrangement is employed.

FIG. 3 schematically shows a lock-protected brake systems for motor vehicles. A brake pedal 1 serves to actuate a brake pressure generator unit 31 via an actuation element. The brake pressure generator unit 31 comprises a brake cylinder 32 within which a piston 33 forms a pressure chamber 34. The pressure chamber 34 is supplied with brake fluid from a reservoir 35. A brake line 36 leads from the pressure chamber 35 to a wheel brake 37 of the motor vehicle.

A valve means 38, 39 is arranged in the brake line 36 between the brake pressure generator unit 31 and the wheel brake 37. The valve means 38, 39 is formed by two solenoid valves, each of which being controlled by an electronic control unit ECU in order to modulate the pressure in the wheel brake 37. For this purpose, the electronic control unit ECU senses the rotational behaviour of the vehicle wheel associated with the wheel brake 37 via a sensor 40, in order to adjust pressure build-up, pressure relief, as well pressure holding phases by controlling the solenoid valves 38, 39.

In the electrically non-actuated condition the first solenoid valve 38 assumes its open position, and the second solenoid valve 39 assumes its closed position in order to be able to build up a pressure in the wheel brake 37. If the first solenoid valve 38 only is actuated, the first solenoid valve 38 goes into its closed position and the second solenoid valve 39 remains in its closed position so that the pressure in the wheel brake 37 is maintained constant. If both the first and the second solenoid valves 38, 38 are actuated, the first solenoid valve 38 goes into its closed position and the second solenoid valve 39 goes into its open position. In this case, brake fluid from the wheel brake 37 can flow off via the second solenoid 39 into an intermediate reservoir 41. The brake fluid in the intermediate reservoir 41 can be returned into the brake line 36 via a hydraulic pump 42. The hydraulic pump 42 is driven by an electric motor 43 which is also controlled by the electronic control unit ECU. The valve means 38, 39 can also be designed with a mechanical mass flow control valve instead of the first solenoid valve 38 or with an electromagnetically operated 3/2-way or 3/3-way valve instead of the two solenoid valves 38, 39.

The brake pressure generator unit 31 comprises a pneumatic brake booster 44 for the amplification of the actuation force introduced via the brake pedal 30. A movable wall divides the pneumatic brake booster 44 into a vacuum chamber 45 and a pressure chamber 46. For the generation of the vacuum, the vacuum chamber 45 is connected to a vacuum source Vac which is not shown in detail. In a vehicle which is equipped with an Otto engine, the vacuum which is inherently produced in the intake tube, is available. However, in a vehicle which is powered by a Diesel engine or an electric motor, an additional vacuum pump is required as the vacuum source Vac. Upon an actuation of the brake pedal 30, the brake booster 44 functions in a known manner in that the pressure chamber 46 is subjected to atmospheric pressure so that a pressure difference is acting on the movable wall, which assists the actuation force introduced at the brake pedal 30. In the non-actuated condition the vacuum chamber 45 and the pressure chamber 46 are connected with each other and thus pressure compensated so that no pressure difference is effective at the movable wall.

The brake booster 44 is also electrically controllable via a solenoid arrangement 47. The solenoid arrangement 47 actuates a control valve not shown in detail herein in order to bring the brake booster 44 into various control positions. Firstly, into a first so-called build-up position in which the connection of the vacuum chamber 45 with the pressure chamber 46 is closed, and the connection of the pressure chamber 46 with atmosphere is open so that a pressure difference at the movable wall is built up or increased, respectively. Or, secondly, into a second so-called holding position in which the connection of the vacuum chamber 45 with the pressure chamber 46 and the connection of the pressure chamber 46 with atmosphere are closed so that a pressure difference acting on the movable wall is maintained. Or, thirdly, into a third so-called relief position in which the connection of the vacuum chamber 45 with the pressure chamber 46 is open, and the connection of the pressure chamber 46 with atmosphere is closed so that a pressure difference acting on the movable wall is relieved via a pressure compensation process. For the purpose of bringing the control valve into the different control positions, the electronic control unit ECU supplies the solenoid arrangement 47 with current in such a manner that the adjustment of the above mentioned control positions is effected for example by means of pulse width modulation of the current signal. The brake pressure which is generated in the pressure chamber 46 and introduced into the brake line 36 is sensed by means of a sensor 48 and forwarded to the electronic control unit ECU in order to control the brake pressure as a function of a desired pressure value and/or pressure characteristic.

The electronic controllability of the brake booster 44 makes it possible to carry out braking operations also automatically, i.e. independent of an actuation of the brake pedal 30, which is the case, for example, for the realisation of a vehicle-to-vehicle ranging control. A sensor means 49 is provided in order to sense parameters which are related to the actuation of the brake pedal 30 (pedal travel, pedal force, pedal actuation speed) for the evaluation in the electronic control unit ECU, in order to also carry out braking operations in emergency situations, with, for example, exceeding a certain pedal actuation speed serving as the criterion.

The lock-protected brake system shown in FIG. 3 is adapted, in particular, for a traction-slip as well as a driving dynamics control wherein the inventive valve arrangement 1 is employed. The first fluid connection 7 of the valve arrangement 1 is connected with the brake pressure generator unit 31, and the second fluid connection 9 of the valve arrangement 1 is connected with the inlet side 42e of the pump 42. Therein, the inventive valve arrangement 1 is designed to be electromagnetically operatable and is controlled by the electronic control unit ECU. For this purpose, as is known though not shown in FIGS. 1 and 2, the actuation means 17 is operationally coupled with an armature which cooperates with a solenoid arrangement.

Parallel to the valve arrangement 1, a solenoid valve 50 which is controlled by the electronic control unit ECU is arranged in the brake line 36 between the brake pressure generator unit 31 and the outlet side 42a of the pump 42, which in the non-actuated condition makes the connection between the brake pressure generator unit 31 and the wheel brake 37, and which blocks same in the actuated condition, so that the outlet side 42a of the pump 42 is connected only with the wheel brake 37. The valve arrangement 1 and the solenoid valve 50 are controlled (almost) simultaneously by the electronic control unit ECU, in order to connect the brake pressure generator unit 31 either with the wheel brake 37 or with the suction side 42e of the pump 42. A pressure limiting valve 51 is connected in parallel to the solenoid valve 50, which upon exceeding a certain pressure value in the wheel brake 37 or at the outlet side 42a of the pump 42, respectively, makes a connection from the wheel brake 37 or the outlet side 42a of the pump 42, respectively, to the brake pressure generator 31 in order to avoid damage of the brake system. At this point it should be noted that the valve arrangement 1 and the solenoid valve 50 can be replaced by a 3/2-way valve in the known manner, wherein the pressure limiting valve 51 can be combined with the valve arrangement 1 and/or with the solenoid valve 50.

A check valve 52 is arranged between the intermediate reservoir 41 and the inlet side 42e of the pump 42 so that a flow connection can be made only in the direction from the intermediate reservoir 41 to the side 42e of the pump 42. This prevents brake fluid from escaping into the intermediate reservoir 41 upon precharging of the inlet side 42e of the pump 42, for which purpose the valve arrangement 1 is actuated.

In a traction-slip control, i.e. when the electronic control unit ECU detects a spinning tendency of the wheel associated with the wheel brake 37, the valve arrangement 1 and the solenoid valve 50 are actuated. Due to the fact that there is no actuation of the brake pedal 30 in a traction-slip control, the pump 42 can take brake fluid from the reservoir 35 via the pressure chamber 34 and the valve arrangement 1 and, because the solenoid valve 50 blocks the connection with the brake pressure generator unit 31, immediately subject the wheel brake 37 to this brake fluid in order to counteract the spinning tendency. In this case it is advantageous that the inventive valve arrangement 1 opens a relatively large flow cross-section so that the pump 42 can deliver a sufficiently large volume flow, in particular, at low temperatures.

Opposite to that, in a driving dynamics control which improves the vehicle stability, in particular, when driving through a curve, by means of automatic braking, the inlet side 42e is additionally precharged with a brake pressure generated by the brake pressure generator unit 31 in order to achieve a very rapid pressure build-up in the wheel brake 37. This is done by automatically controlling the brake booster 44, for which purpose a pressure in the order of 5 to 30 bar is set in the pressure chamber 34 of the brake pressure generator unit 31 which, among others, is dependent on the nature of the road surface. By precharging the pump 42 via its suction side 42e, it is achieved that a sufficient pressure is available at the outlet side 42a of the pump 42 already during the start-up phase. Due to the inventive configuration of the valve arrangement 1, no disadvantages will result when the valve arrangement 1 is actuated against the pressure generated by the pressure generator unit 31. According to the invention, no restrictions as to the dimensioning of the flow cross-section of the valve arrangement 1 will result so that, in particular, the very good behaviour under low temperatures is maintained.

What is claimed is:

1. A valve arrangement for a lock-protected brake system comprising:

a first and a second fluid connection;

a first valve element biased into a first position by a first spring arrangement in which the first and the second fluid connections are blocked from each other;

an actuation means adapted to move the valve element into a second position in which the first and the second fluid connections are in a primary flow connection;

a second valve element which is biased into a first position by a second spring arrangement in which the first and the second fluid connections are in a secondary flow connection, so that upon an actuation of the valve arrangement, the first and the second fluid connections are initially in the secondary flow connection only, and subsequently are in the primary flow connection or in both the primary and the secondary flow connections, with the flow cross-section of the primary flow connection being larger than the flow cross-section of the secondary flow connection, wherein the first valve element is dome-shaped and the second valve element is spherically formed, with the second valve element being arranged within the first valve element.

2. The valve arrangement specified in claim 1 wherein the actuation means is controlled electromagnetically.

3. The valve arrangement specified in claim 1 wherein the actuation means is controlled hydraulically.

4. The valve arrangement specified in claim 1 wherein both the first and second valve elements are actuated by a common actuation means.

5. The valve arrangement specified in claim 1 wherein a biasing force of the first spring arrangement is greater a biasin g force of the second spring arrangement.

6. The valve arrangement specified in claim 1 wherein the primary flow connection is determined by a sealing seat formed at the housing of the valve arrangement and by the first valve element.

7. The valve arrangement specified in claim 1 wherein the secondary flow connection is determined by a sealing seat formed at the first valve arrangement and the second valve element.

8. The valve arrangement specified in claim 1 wherein the first spring arrangement bears against a housing of the valve arrangement.

9. The valve arrangement specified in claim 1 wherein the second spring arrangement is supported via the first valve element.

10. The valve arrangement specified in claim 1 wherein the second valve element is integrally connected with the actuation means.

11. The valve arrangement specified in claim 20 wherein the second spring arrangement biases the actuation means in order for the second valve element to assume its first position, with the second spring arrangement bearing against the housing of the valve arrangement.

12. The valve arrangement specified in claim 1 wherein the first fluid connection is connected with a brake pressure generator unit and the second fluid connection is connected with an inlet side of a pump.

* * * * *

UNITED STATES PATENT AND TRADEMARK OFFICE
CERTIFICATE OF CORRECTION

PATENT NO. : 6,213,570 B1
DATED : April 10, 2001
INVENTOR(S) : Helmut Gegalski et al.

It is certified that error appears in the above-identified patent and that said Letters Patent is hereby corrected as shown below:

Column 10,
Line 1, delete "20" and insert -- 10 --.
Line 2, after the word "greater" insert -- than --.

Signed and Sealed this

Second Day of August, 2005

JON W. DUDAS
*Director of the United States Patent and Trademark Office*